Patented June 6, 1933

1,912,856

UNITED STATES PATENT OFFICE

MATHIAS PIER, OF HEIDELBERG, AND HEINZ LEMME, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SEPARATION OF LIQUID CONSTITUENTS FROM MIXTURES OF SOLIDS AND LIQUIDS

No Drawing. Original application filed May 13, 1929, Serial No. 362,862, and in Germany May 22, 1928. Divided and this application filed August 21, 1930. Serial No. 476,937.

This invention relates to improvements in the separation of the liquid constituents from mixtures of solids and liquids and in particular such as are obtained in the destructive hydrogenation of distillable carbonaceous materials.

The separation of the liquid products, such as oils, tars or the like obtained by the destructive hydrogenation of distillable carbonaceous materials, such as various kinds of coal, tars, mineral oils and the like, from the mixtures of the said products with solid and usually carbonaceous residues by centrifuging or filtration is frequently very difficult by reason of the fact that the solid constituents are usually very finely dispersed in the oil, tar or the like.

We have now found that the separation of the liquids from mixtures thereof with solid materials which separation is effected by centrifuging or filtration can be carried out in a much simpler manner and with greater speed, if substances which cause flocculation be added to the substances to be separated, with or without the employment of solvents, such solvents, for example, being liquid hydrocarbons, for example mineral oils, tar oils, benzine, benzene, toluene or xylene. In part the residues have a colloidal character which is destroyed by the said additions causing the separation of flocks, so that the filtration or the centrifuging may be effected in a fraction of the time required without the employment of the said additions.

Inorganic substances, such as inorganic or organic acids or salts, for example formic acid, sulphuric acid, aluminium sulphate, manganese resinate and the like are especially suitable as additions causing the separation of flocks. Additions such as brown coal ash, light ashes, sawdust, peat, brown coal powder and the like also have the effect of causing flocculation of colloidal constituents of the residues. The effect of these latter substances is apparently due to surface activity. By the addition of distillable substances, such as sawdust, besides the flocculating action, an improvement in the residues remaining after separation of the oil as regards their content in distillable products, which if desired may be further worked up in a low temperature carbonization plant, is effected.

Gases may be employed with particular advantage as agents for the separation of the solid and liquid constituents of the aforesaid mixtures, or of similar mixtures of solid and liquid products, such as tars or tar oils with a content of dust and in particular such gases, which when dissolved in water give rise to an acid reaction. The said gases causing a separation of flocks are allowed to act on the mixtures of liquid and solid products, which are therefore filtered or centrifuged. Carbon dioxide or sulphur dioxide or chlorine have been found to be particularly advantageous for the said purpose. The said gases are usually passed into the mixtures under treatment.

The said substances having a flocculating action probably act either by means of surface activity or they are electrolytes and probably have a depolarizing action. The effect of the said additions depends on the nature of the initial materials to be treated. In particular it is preferable to remove the alkalinity of the residues before the treatment.

The treatment of the mixtures of solid and liquid materials may be carried out at room temperature or at an elevated temperature. The temperature must be sufficiently high to promote the fluidity necessary for the separation.

The following examples will further illustrate how the said invention may be carried out in practice, but the invention is not restricted to these examples.

Example 1

50 kilograms of residues obtained by the destructive hydrogenation of brown coal are heated to about 110° C. for a period of about 5 minutes together with 50 kilograms of heavy benzine after the addition of from 0.5 to 1 per cent of formic acid (calculated with reference to the initial material) and the whole is then filtered. The period of time necessary for the filtration is reduced by about 90 per cent in contrast to that necessary for the filtration without the addition of formic acid. Aluminium sulphate or manganese resinate may be employed instead of the formic acid.

*Example 2*

50 kilograms of residues containing about 40 per cent of solid constituents obtained by the destructive hydrogenation of brown coal are stirred with about from 10 to 15 per cent of light ashes or sawdust after heating to about 110° C., and after dilution with 50 kilograms of heavy benzine the whole is stirred for about another 5 minutes at 110° C. and is then filtered. The reduction in the time necessary for the filtration in contrast to that when working without additions amounts to about 85 per cent.

The present application has been divided out from our copending application Ser. No. 362,862 filed 13th May, 1929, in which we claim the step of treating the mixture to be separated of liquid hydrocarbon products and solid carbonaceous materials with a gas causing the separation of flocks.

What we claim is:—

1. In the separation of liquid hydrocarbon products from solid carbonaceous matter suspended in the residues from the destructive hydrogenation of coal, the steps of mixing a substance having a flocculating action selected from the class consisting of sawdust, aluminum sulphate and manganese resinate with the residue and then filtering the resulting mixture.

2. In the separation of liquid hydrocarbon products from solid carbonaceous matter suspended in the residues from the destructive hydrogenation of coal, the steps of mixing sawdust with said residues and then filtering the resulting mixture.

In testimony whereof we affix our signatures.

MATHIAS PIER.
HEINZ LEMME.